(12) United States Patent
Yamamoto et al.

(10) Patent No.: US 8,868,272 B2
(45) Date of Patent: Oct. 21, 2014

(54) ELECTRIC VEHICLE AND METHOD OF CONTROLLING THE SAME

(71) Applicants: Masaya Yamamoto, Kasugai (JP); Jun Yasue, Toyota (JP)

(72) Inventors: Masaya Yamamoto, Kasugai (JP); Jun Yasue, Toyota (JP)

(73) Assignees: Toyota Jidosha Kabushiki Kaisha, Aichi-ken (JP); Denso Corporation, Aichi-ken (JP)

( * ) Notice: Subject to any disclaimer, the term of this patent is extended or adjusted under 35 U.S.C. 154(b) by 0 days.

(21) Appl. No.: 13/770,217

(22) Filed: Feb. 19, 2013

(65) Prior Publication Data
US 2013/0218382 A1   Aug. 22, 2013

(30) Foreign Application Priority Data
Feb. 22, 2012 (JP) ................... 2012-036294

(51) Int. Cl.
| | | |
|---|---|---|
| B60L 9/00 | (2006.01) | |
| B60W 10/04 | (2006.01) | |
| H01M 12/00 | (2006.01) | |
| B60L 11/18 | (2006.01) | |
| B60L 15/20 | (2006.01) | |

(52) U.S. Cl.
CPC ......... B60L 11/1851 (2013.01); B60L 11/1861 (2013.01); B60L 15/2045 (2013.01); *Y02T 10/7011* (2013.01); *Y02T 10/7005* (2013.01); *Y02T 10/705* (2013.01); *Y02T 10/642* (2013.01); *Y02T 10/7044* (2013.01); *B60L 2240/12* (2013.01); *B60L 2240/547* (2013.01); *B60L 2240/549* (2013.01); *B60L 2240/423* (2013.01)
USPC ............................ 701/22; 180/65.285; 429/9

(58) Field of Classification Search
USPC .............................. 701/22; 429/9; 180/65.285
See application file for complete search history.

(56) References Cited

U.S. PATENT DOCUMENTS

| | | | |
|---|---|---|---|
| 5,600,215 A | | 2/1997 | Yamada et al. |
| 5,719,486 A | * | 2/1998 | Taniguchi et al. ............... 322/28 |
| 6,868,318 B1 | * | 3/2005 | Cawthorne et al. .............. 701/22 |
| 7,383,902 B2 | * | 6/2008 | Matsuzaki et al. ....... 180/65.285 |
| 7,521,138 B2 | * | 4/2009 | Pearson ............................. 429/9 |
| 7,640,084 B2 | * | 12/2009 | Musser ........................... 701/22 |
| 7,971,669 B2 | * | 7/2011 | Gieray et al. .............. 180/65.29 |
| 8,224,544 B2 | * | 7/2012 | Sah et al. ......................... 701/68 |
| 2003/0105562 A1 | * | 6/2003 | Hsiao et al. ..................... 701/22 |
| 2003/0218447 A1 | * | 11/2003 | Coates et al. ................. 320/134 |
| 2005/0104558 A1 | | 5/2005 | Murakami et al. |

(Continued)

FOREIGN PATENT DOCUMENTS

| | | |
|---|---|---|
| JP | 08-023603 A | 1/1996 |
| JP | 10-248104 A | 9/1998 |
| JP | 2003-199258 A | 7/2003 |

*Primary Examiner* — Thomas G Black
*Assistant Examiner* — Tyler Paige
(74) *Attorney, Agent, or Firm* — Sughrue Mion, PLLC

(57) ABSTRACT

An electric vehicle includes an electric storage device, an electric motor that generates driving force for running the vehicle, using electric power output from the storage device, and a controller that controls an output of the storage device. The controller includes a restriction control unit that restricts a permissible output power indicating electric power permitted to be output from the storage device, based on a load condition of the storage device, and an output control unit that reduces the rate of increase of the electric power output from the storage device as the permissible output power is more likely to be restricted when returning from a restricted condition in which the permissible output power is restricted by the restriction control unit.

13 Claims, 9 Drawing Sheets

(56) References Cited

U.S. PATENT DOCUMENTS

2006/0021809 A1* 2/2006 Xu et al. .................... 180/65.2
2010/0176765 A1* 7/2010 Shigemizu et al. ........... 320/134
2012/0123619 A1* 5/2012 Chen et al. .................... 701/22
2012/0280573 A1* 11/2012 Ohkura et al. ................ 307/80
2012/0298433 A1* 11/2012 Ohkura ....................... 180/65.1
2013/0218382 A1* 8/2013 Yamamoto et al. ............ 701/22

* cited by examiner

FIG. 8

| EVALUATION FUNCTION | E1 | E2 | E3 | E4 | E5 |
|---|---|---|---|---|---|
| Wout INCREASE RATE | ×1.0 | ×1.0 | ×0.5 | ×0.2 | ×0.1 |

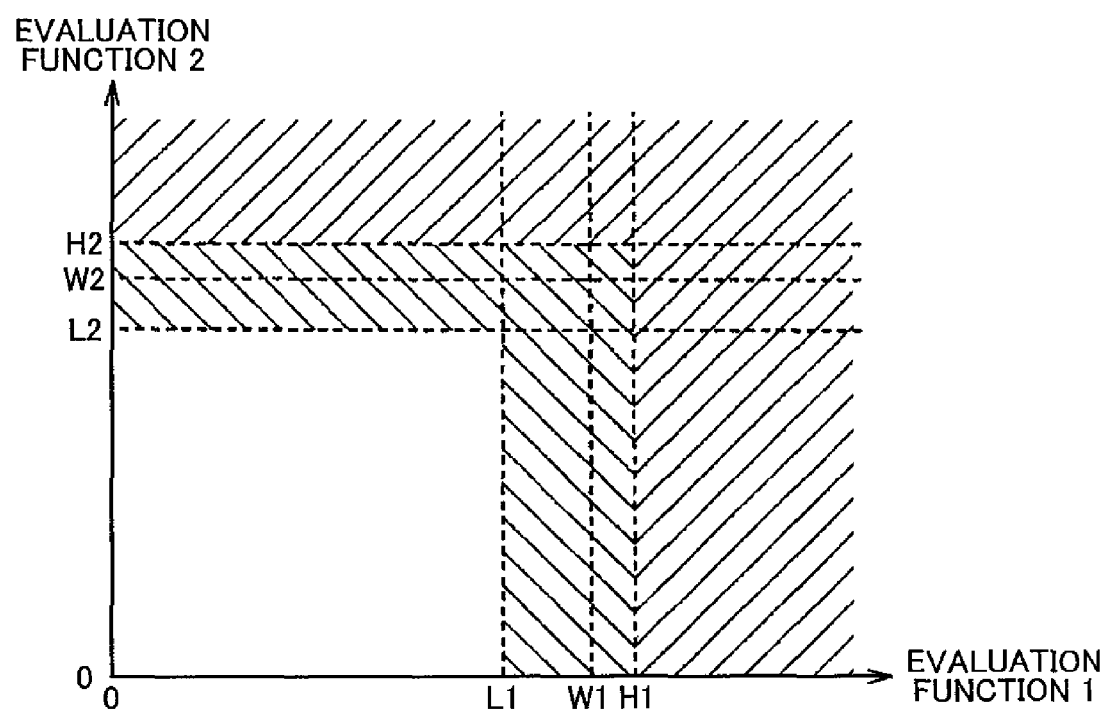

ELECTRIC VEHICLE AND METHOD OF CONTROLLING THE SAME

INCORPORATION BY REFERENCE

The disclosure of Japanese Patent Application No. 2012-036294 filed on Feb. 22, 2012 including the specification, drawings and abstract is incorporated herein by reference in its entirety.

BACKGROUND OF THE INVENTION

1. Field of the Invention

The invention relates to an electric vehicle and a method of controlling the electric vehicle, and particularly relates to an electric vehicle in which an electric motor generates driving force for running the vehicle, using electric power output from an electric storage device, and a method of controlling the electric vehicle.

2. Description of Related Art

A controller of an electric vehicle that obtains energy for running the vehicle from a storage battery is disclosed in Japanese Patent Application Publication No. 8-23603 (JP 8-23603 A). The controller determines that the remaining battery charge of the storage battery has been reduced if the voltage of the storage battery is kept at a low level for a given period of time, and restricts a torque command value to be output to an electric motor by reducing the command value at a given rate of reduction. As a result, the torque of the electric motor is reduced, and the electric power required to be output from the storage battery is reduced, so that the vehicle can keep running without causing the voltage of the storage battery to be rapidly or sharply reduced.

In the controller as described above, the restriction of the torque command is cancelled when the operation amount of the accelerator pedal becomes equal to zero. In this condition, if the accelerator pedal is depressed again, the voltage of the storage battery is naturally reduced. However, since it takes some period of time until this condition is detected, the electric motor can generate torque required to accelerate the vehicle within this period of time. As a result, the vehicle can be accelerated or run at a high load, as needed (see JP 8-23603 A).

In the controller as described in JP 8-230603 A, the restriction of the torque command is cancelled when the operation amount of the accelerator pedal becomes equal to zero. However, a specific method or manner of cancelling restriction of the torque command has not been studied. In this connection, it is deemed desirable to promptly cancel restriction of the output when appropriate; however, if the accelerator pedal is depressed under a situation where the output is likely to be restricted again, after cancellation of the output restriction, the output may be restricted immediately after acceleration, resulting in deterioration of the driveability.

SUMMARY OF THE INVENTION

The invention provides an electric vehicle having an electric motor that generates driving force for running the vehicle, using electric power output from an electric storage device, wherein deterioration of the driveability due to rapid variations in the driving force is reduced, and a method of controlling the electric vehicle.

According to a first aspect of the invention, an electric vehicle includes an electric storage device, an electric motor that generates driving force for running the vehicle, using electric power output from the electric storage device, and a controller that controls an output of the electric storage device. The controller includes a restriction control unit that restricts a permissible output power indicating electric power that is permitted to be output from the electric storage device, based on a load condition of the electric storage device, and an output control unit that reduces the rate of increase of the electric power output from the electric storage device as the permissible output power is more likely to be restricted by the restriction control unit when returning from a restricted condition in which the permissible output power is restricted by the restriction control unit.

According to a second aspect of the invention, a method of controlling an electric vehicle including an electric storage device, and an electric motor that generates driving force for running the vehicle, using electric power output from the electric storage device, includes restricting a permissible output power indicating electric power that is permitted to be output from the electric storage device, based on a load condition of the electric storage device, and reducing a rate of increase of the electric power output from the electric storage device as the permissible output power is more likely to be restricted when returning from a restricted condition in which the permissible output power is restricted.

According to the first and second aspects of the invention, the permissible output power (Wout) of the electric storage device is restricted based on the load condition of the electric storage device. Since the rate of increase of electric power output from the electric storage device is reduced as the permissible output power is more likely to be restricted when returning from the condition where the permissible output power is restricted, rapid output variations due to restriction of the permissible output power and returning from the restricted condition are suppressed or lessened. Thus, according to the first and second aspect of the invention, deterioration of the driveability due to rapid variations in the driving force for running the vehicle can be curbed or reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a view showing one example of the rate of increase of permissible output power set according to the value of the evaluation function; and FIG. 9 is a view showing the relationship between values of two evaluation functions and load conditions of the electric storage device.

DETAILED DESCRIPTION OF EMBODIMENTS

Figure 1:
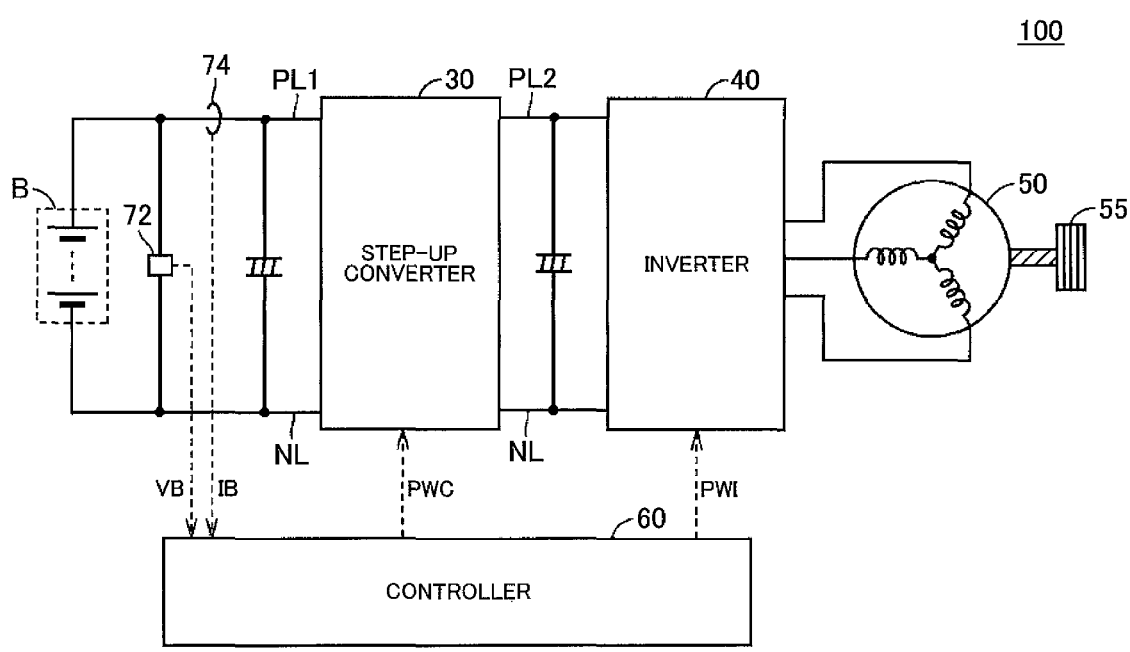
FIG. 1 is a view showing the overall construction of an electric vehicle according to one embodiment of the invention.

One embodiment of the invention will be described in detail with reference to the drawings. The same reference numerals are assigned to the same or corresponding elements or portions, of which explanation will not be repeated.

FIG. 1 illustrates the overall construction of an electric vehicle according to the embodiment of the invention. Referring to FIG. 1, the electric vehicle 100 includes an electric storage device B (which will be simply called "storage device"), a step-up converter 30, an inverter 40, a motor-generator 50, and driving wheels 55. The electric vehicle 10 further includes a voltage sensor 72, a current sensor 74, and a controller 60.

The storage device B is a rechargeable DC power supply, for example, a secondary battery, such as a nickel-metal-hydride battery or a lithium-ion battery. The storage device B stores electric power used for running the vehicle, and supplies the electric power to the step-up converter 30. The storage device B is charged with regenerative electric power generated by the motor-generator 50 when the brakes are applied to the vehicle, for example. A large-capacity capacitor may also be employed as the storage device B.

The step-up converter 30 is provided between the storage device B and the inverter 40. The step-up converter 30 boosts the voltage between a positive electrode line PL1 and a negative electrode line NL, based on a signal PWC from the controller 60, so that the voltage between a positive electrode line PL2 and the negative electrode line NL becomes equal to or higher than that of the storage device B. For example, the step-up converter 30 takes the form of a bi-directional chopper circuit including a reactor connected to the positive electrode line PL1, and upper and lower arms connected in series between the positive electrode line PL2 and the negative electrode line NL.

The inverter 40 converts DC power supplied from the step-up converter 30 into AC power, based on a signal PWI from the controller 60, and outputs the AC power to the motor-generator 50 so as to drive the motor-generator 50. The inverter 40 also converts AC power generated by the motor generator 50 when the brakes are applied to the vehicle, for example, into DC power, based on the signal PWI, and outputs the DC power to the positive electrode line PL2. For example, the inverter 40 takes the form of a bridge circuit including switching devices for three phases.

The motor-generator 50 is an AC motor-generator, for example, a three-phase AC synchronous motor-generator, which is mechanically coupled to the driving wheels 55. The motor-generator 50 is driven by the inverter 40, and generates driving force for running the vehicle. The motor-generator 50 is also operable to generate electric power when receiving kinetic energy of the vehicle from the driving wheels 55 during braking of the vehicle, for example. If the electric vehicle 100 is a hybrid vehicle, the motor-generator 50 may be mechanically coupled to an engine (not shown), and incorporated in the hybrid vehicle, such that the motor-generator 50 is operable to generate electric power using power of the engine, and is also operable to start the engine.

The voltage sensor 72 detects the voltage VB of the storage device B, and outputs the detection value to the controller 60. The current sensor 74 detects the current IB flowing into or out of the storage device B, and outputs the detection value to the controller 60.

The controller 60 controls the step-up converter 30 and the inverter 40, and input and output of the storage device B, through software processing using CPU (Central Processing Unit) for executing pre-stored programs, and/or hardware processing using a dedicated electronic circuit(s).

More specifically, the controller 60 creates a PWM (Pulse Width Modulation) signal for causing the inverter 40 to drive the motor-generator 50, based on the operation amount of the accelerator pedal, the vehicle speed, and so forth, and outputs the created PWM signal as signal PWI to the inverter 40. The controller 60 also creates a PWM signal for driving the step-up converter 30, based on the required power of the motor-generator 50, and so forth, and outputs the created PWM signal as signal PWC to the step-up converter 30.

The controller 60 controls permissible output power Wout that represents electric power that can be output by the storage device B, based on the state of charge (SOC) and load condition of the storage device B. The permissible output power Wout is set so as to suppress or prevent excessive output of the storage device B. If the output power of the storage device B reaches the permissible output power Wout, the output of the motor-generator 50 is restricted so that the output power of the storage device B does not exceed the permissible output power Wout. The load condition of the storage device B changes depending on input and output conditions, temperature, etc. of the storage device B. For example, when the input or output current of the storage device B or its integrated value is large, or the temperature of the storage device B is high, it may be determined that the storage device B is in a high-load condition. The control of the permissible output power Wout will be described in detail later.

Figure 2:
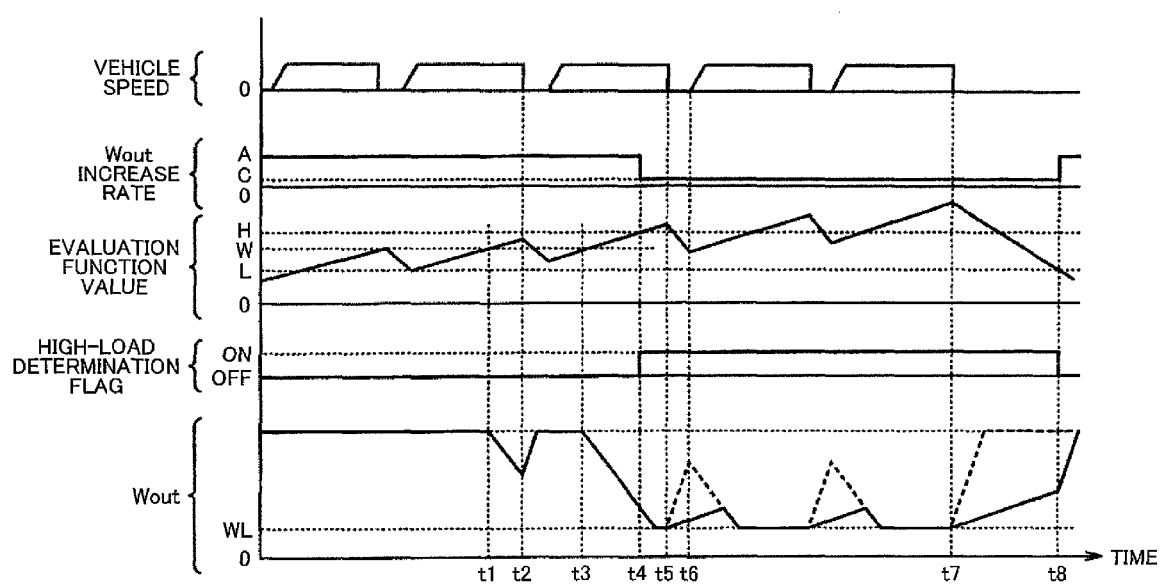
FIG. 2 is a view showing one example of how the permissible output power (Wout) of an electric storage device changes.

FIG. 2 shows one example of how the permissible output power Wout of the storage device B varies with time. In FIG. 2, the dotted line indicates how the permissible output power Wout varies with time in the case of the related art.

Referring to FIG. 2, "evaluation function value" is a value of an evaluation function for evaluating a load condition of the storage device B. For example, the evaluation function is a function using electric current IB flowing into or out of the storage device B, or its integrated value, or the like, as a parameter, and the value of the evaluation function increases as the current IB or its integrated value increases. If the evaluation function value exceeds a threshold value W, the permissible output power Wout is restricted and reduced so as to protect the storage device B (hereinafter, the control for restricting the permissible output power Wout will be called "protection control"). If the evaluation function value exceeds a threshold value H (> the threshold value W), it is determined that the storage device B is in a high-load condition, and a high-load determination flag FLG is set to ON. If the evaluation' function value falls below a threshold value L (<the threshold values H, W), it is determined that the storage device B is in a low-load condition, and the high-load determination flag FLG is set to OFF. The high-load determination flag FLG is set to OFF when the evaluation function value falls below the threshold value L that is lower than the threshold value H, so that the result of determination of the load condition is prevented from being unnecessarily frequently switched or changed around the threshold value.

If the evaluation function value exceeds the threshold value W at time t1, the protection control for the storage device B is initiated, and the permissible output power Wout is reduced. If the vehicle stops and the output from the storage device B becomes equal to zero at time t2, the evaluation function value is reduced. If the evaluation function value is reduced, restriction of the permissible output power Wout is cancelled (i.e., the permissible output power Wout is increased). At time t2, the high-load determination flag FLG that indicates that the storage device B is in a high-load condition is OFF; therefore, the permissible output power Wout returns to its non-restricted level at a predetermined rate of increase A.

If the evaluation function value exceeds the threshold value W again at time t3, the permissible output power Wout is reduced again. If the evaluation function value further exceeds the threshold value H at time t4, it is determined that the storage device B is in a high-load condition, and the high-load determination flag FLG is set to ON. In this embodiment, when the high-load determination flag FLG is ON, the rate of change of the permissible output power Wout when the permissible output power Wout returns from the restricted condition is switched from the rate of increase A to a rate of increase C (<A).

If the vehicle stops and the output from the storage device B becomes equal to zero at time t5, the evaluation function value is reduced, and restriction of the permissible output power Wout is cancelled. Here, since the high-load determination flag FLG is ON, the permissible output power Wout returns from the restricted condition at the rate of increase C that is smaller than the rate of increase A. As a result, rapid variations in the permissible output power Wout are suppressed, and the drivability is less likely to deteriorate due to rapid variations in the driving force for running the vehicle.

Namely, according to the related art, if the vehicle stops and the output from the storage device B becomes equal to zero at time t5, the permissible output power Wout rapidly returns at the rate of increase A, as indicated by the dotted line. However, if the vehicle starts being accelerated again at time t6, under a situation where the storage device B is in a high-load condition, and the permissible output power Wout is likely to be restricted, the permissible output power Wout may be restricted again and reduced, and the output of the storage device B may be rapidly or sharply varied. The variation in the permissible output power Wout during acceleration results in a rapid variation in the driving force for running the vehicle, and incurs deterioration of the driveability.

In this embodiment, when the permissible output power Wout returns from the restricted condition, the rate of increase of the permissible output power Wout is switched from the rate of increase A to the rate of increase C (<A) if the permissible output power Wout is likely to be restricted, namely, if the storage device B is in a high-load condition. In this manner, rapid variations in the driving force for running the vehicle and deterioration of the driveability are suppressed or reduced.

Figure 3:
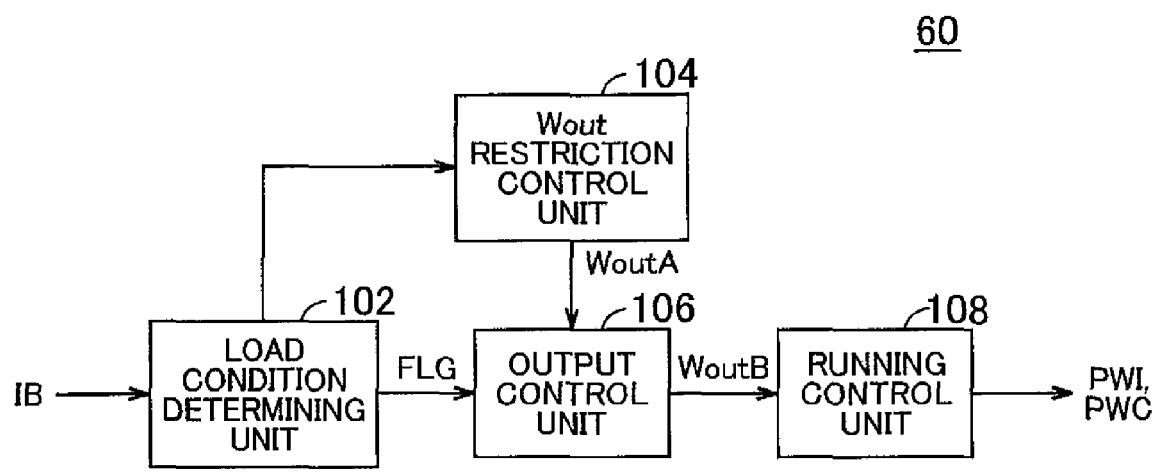
FIG. 3 is a functional block diagram of a controller shown in FIG. 1.

FIG. 3 is a functional block diagram of the controller 60 shown in FIG. 1. Referring to FIG. 3, the controller 60 includes a load condition determining unit 102, a Wout restriction control unit 104, an output control unit 106, and a running control unit 108.

The load condition determining unit 102 determines a load condition of the storage device B, based on a given evaluation function indicating the load condition of the storage device B. As described above, the load condition of the storage device B changes depending on the input/output condition, temperature, etc. of the storage device B. For example, when the input/output current of the storage device B or its integrated value is large, or the temperature of the storage device B is high, it may be determined that the storage device B is in a high-load condition. The evaluation function is a function for evaluating the load condition of the storage device B. As one example, the evaluation function is a function based on current IB flowing into or out of the storage device B, and the value of the evaluation function increases as the current IB or its integrated value increases.

Figure 4:
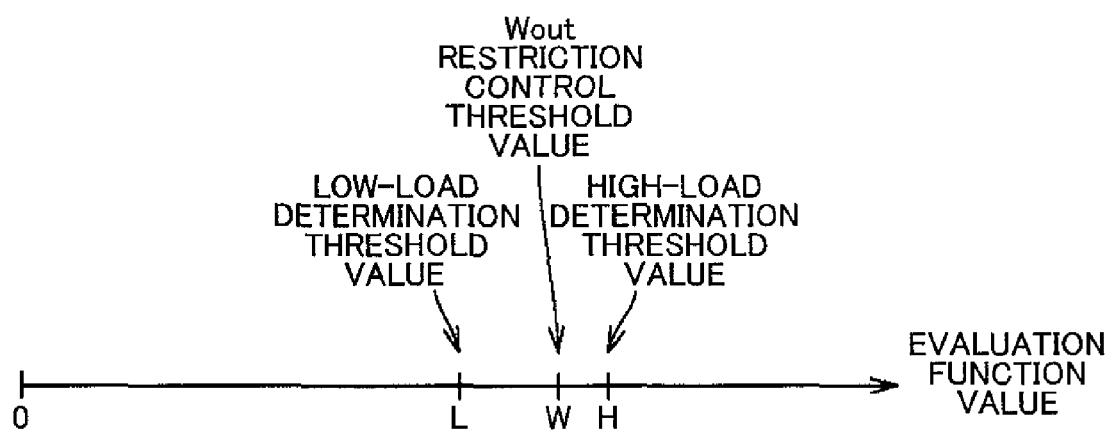
FIG. 4 is a view showing the relationship between values of an evaluation function and load conditions of the electric storage device.

If the evaluation function value exceeds the threshold value H indicating that the storage device B is in a high-load condition, as shown in FIG. 4, the load condition determining unit 102 determines that the storage device B is in a high-load condition, and sets the high-load determination flag FLG to be output to the output control unit 106, to ON. If the evaluation function value falls below the threshold value L (FIG. 4) indicating that the storage device B is in a low-load condition, the load condition determining unit 102 determines that the storage device B is in a low-load condition, and sets the high-load determination flag FLG to OFF.

The Wout restriction control unit 104 restricts the permissible output power Wout of the storage device B, based on the load condition of the storage device B. More specifically, the Wout restriction control unit 104 initially sets a default value of the permissible output power Wout, based on the SOC, temperature, etc. of the storage device B. The default value, which is a value established when the permissible output power Wout is not restricted by the Wout restriction control unit 104, is set using a map or mathematical expression(s) prepared in advance.

Then, the Wout restriction control unit 104 receives the evaluation function value calculated by the load condition determining unit 102, from the load condition determining unit 102, and restricts the permissible output power Wout by reducing the permissible output power Wout from the default value, if the evaluation function value exceeds the threshold value W (FIG. 4). The threshold value W is set to a value that is smaller than the threshold value H and larger than the threshold value L.

If the value of the evaluation function is reduced due to stop of the vehicle, for example, the Wout restriction control unit 104 returns the permissible output power Wout from its restricted condition. The rate of return of the permissible output power Wout calculated by the Wout restriction control unit 104 is the rate of increase A (FIG. 2). The control for limiting the rate of increase of the permissible output power Wout to the rate of increase C (FIG. 2) when the storage device B is in a high-load condition is performed by the output control unit 106 which will be described later. The Wout restriction control unit 104 outputs the permissible output power on which the operation to restrict the permissible output power Wout if the evaluation function value exceeds the threshold value W is performed, as WoutA, to the output control unit 106.

The output control unit 106 changes the rate of increase of the permissible output power Wout from the rate of increase A to the rate of increase C (<A), in a situation where the permissible output power Wout is likely to be restricted again, when returning from a condition where the permissible output power Wout is restricted by the Wout restriction control unit 104. It is determined whether or not the permissible output power Wout is likely to be restricted, based on the high-load determination flag FLG received from the load condition determining unit 102. Namely, when the high-load determination flag FLG is ON, the output control unit 106 determines that the permissible output power Wout is likely to be restricted.

In the situation where the permissible output power Wout is likely to be restricted, the output control unit 106 performs an operation to limit the rate of increase to the rate of increase C (FIG. 2), on the permissible output power WoutA received from the Wout restriction control unit 104, and outputs the permissible output power on which the rate limiting operation has been performed, as WoutB, to the running control unit 108.

The running control unit 108 calculates a target torque of the motor-generator 50, based on the operation amount of the accelerator pedal, vehicle speed, and so forth, and calculates a target power of the motor-generator 50, based on the calculated target torque, vehicle speed, and so forth. When the target power of the motor-generator 50 exceeds the permissible output power WoutB received from the output control unit 106, the running control unit 108 restricts the target power of the motor-generator 50 to the permissible output power WoutB.

Then, the running control unit 108 calculates a torque command value of the motor-generator 50, based on the target power whose upper limit has been set to the permissible output power WoutB, and creates a signal PWI and outputs the signal PWI to the inverter 40 so that the motor-generator 50 generates torque represented by the torque command value.

Further, the running control unit 108 calculates a target value of voltage boosted by the step-up converter 30, based on the target power whose upper limit has been set to the permissible output power WoutB, and creates a signal PWC and outputs the signal PWC to the step-up converter 30 so that the boosted voltage becomes equal to the target value.

Figure 5:
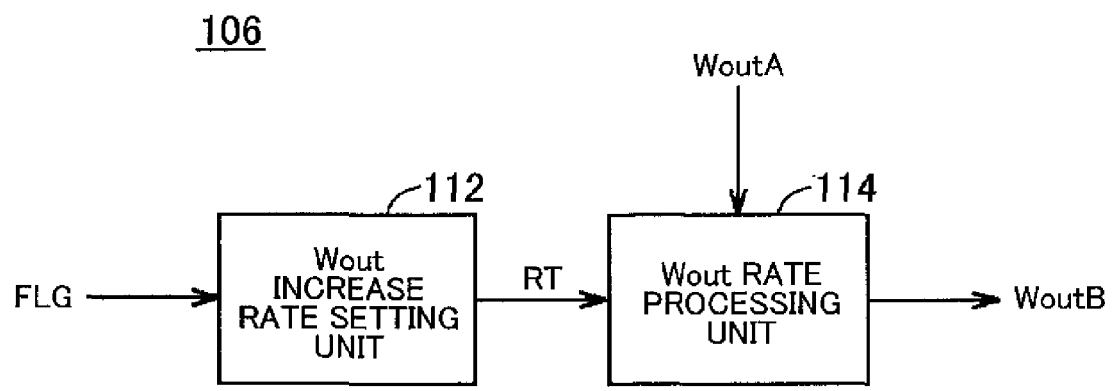
FIG. 5 is a detailed functional block diagram showing an output control unit shown in FIG. 3.

FIG. 5 is a detailed functional block diagram of the output control unit 106 shown in FIG. 3. The output control unit 106 includes a Wout increase-rate setting unit 112, and a Wout rate processing unit 114.

The Wout increase-rate setting unit 112 receives the high-load determination flag FLG from the load condition determining unit 102 (FIG. 3). When the high-load determination flag FLG is OFF, the Wout increase-rate setting unit 112 sets the rate of increase RT of the permissible output power Wout to the rate of increase A. On the other hand, when the high-load determination flag FLG is ON, the Wout increase-rate setting unit 112 switches or changes the rate of increase RT of the permissible output power Wout from the rate of increase A to the rate of increase C.

The Wout rate processing unit 114 receives the permissible output power WoutA from the Wout restriction control unit 104 (FIG. 3). The Wout rate processing unit 114 performs a rate setting operation to set the rate of increase of the permissible output power WoutA to the rate of increase RT, on the permissible output power WoutA. Namely, when the high-load determination flag FLG is ON, a rate setting operation to restrict the rate of change of the permissible output power WoutA to the rate of increase C is performed on the permissible output power WoutA. Then, the Wout rate processing unit 114 outputs the permissible output power subjected to the rate setting operation, as WoutB, to the running control unit 108 (FIG. 3).

Figure 6:
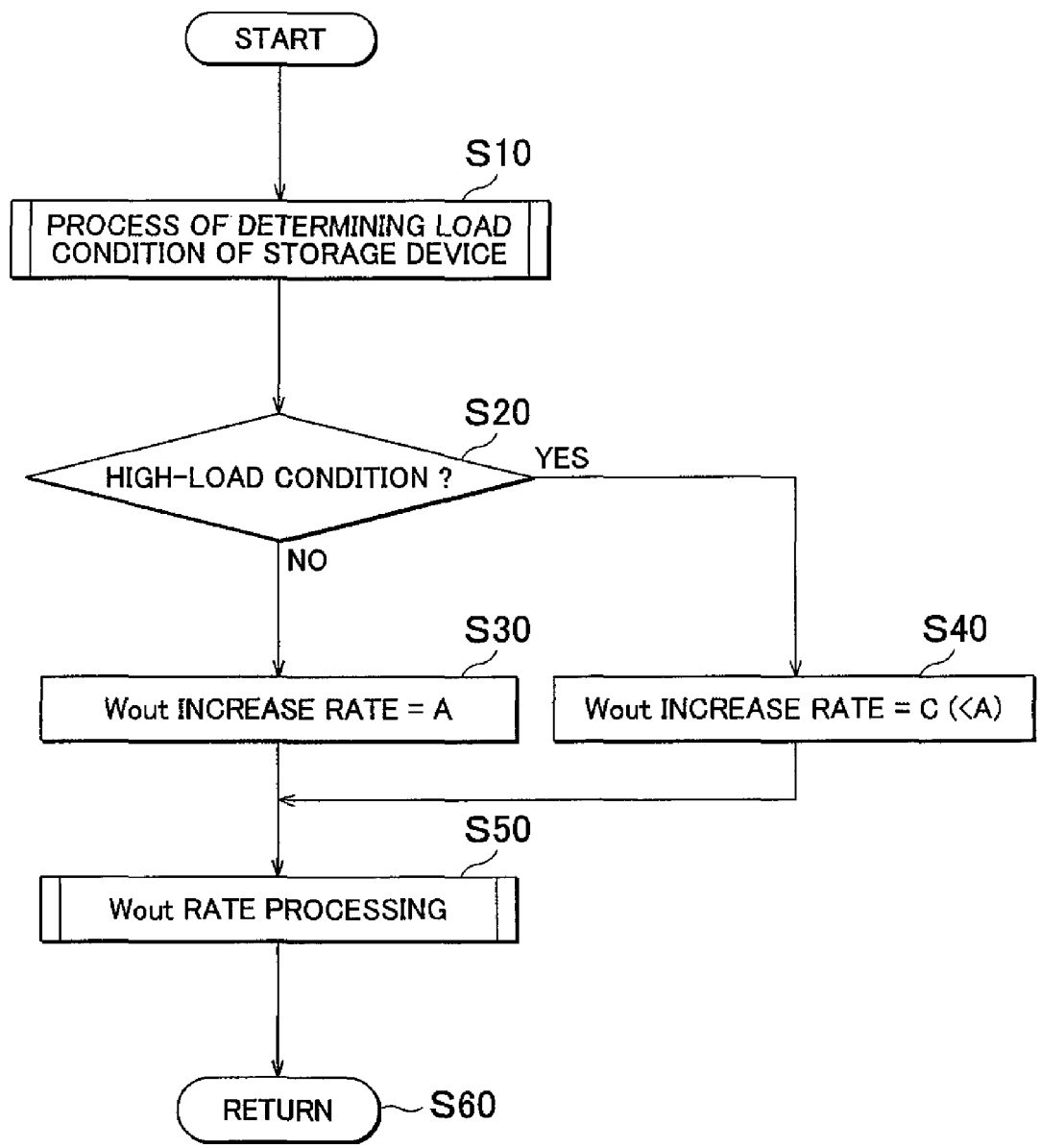
FIG. 6 is a flowchart used for explaining a process executed by the controller with regard to the rate of increase of the permissible output power.

FIG. 6 is a flowchart illustrating a process executed by the controller 60 with regard to the rate of increase of the permissible output power Wout. The process illustrated in the flowchart of FIG. 6 is called for from a main routine and executed, at regular time intervals or each time a given condition is satisfied. Referring to FIG. 6, the controller 60 performs an operation to determine a load condition of the storage device B (step S10).

Figure 7:
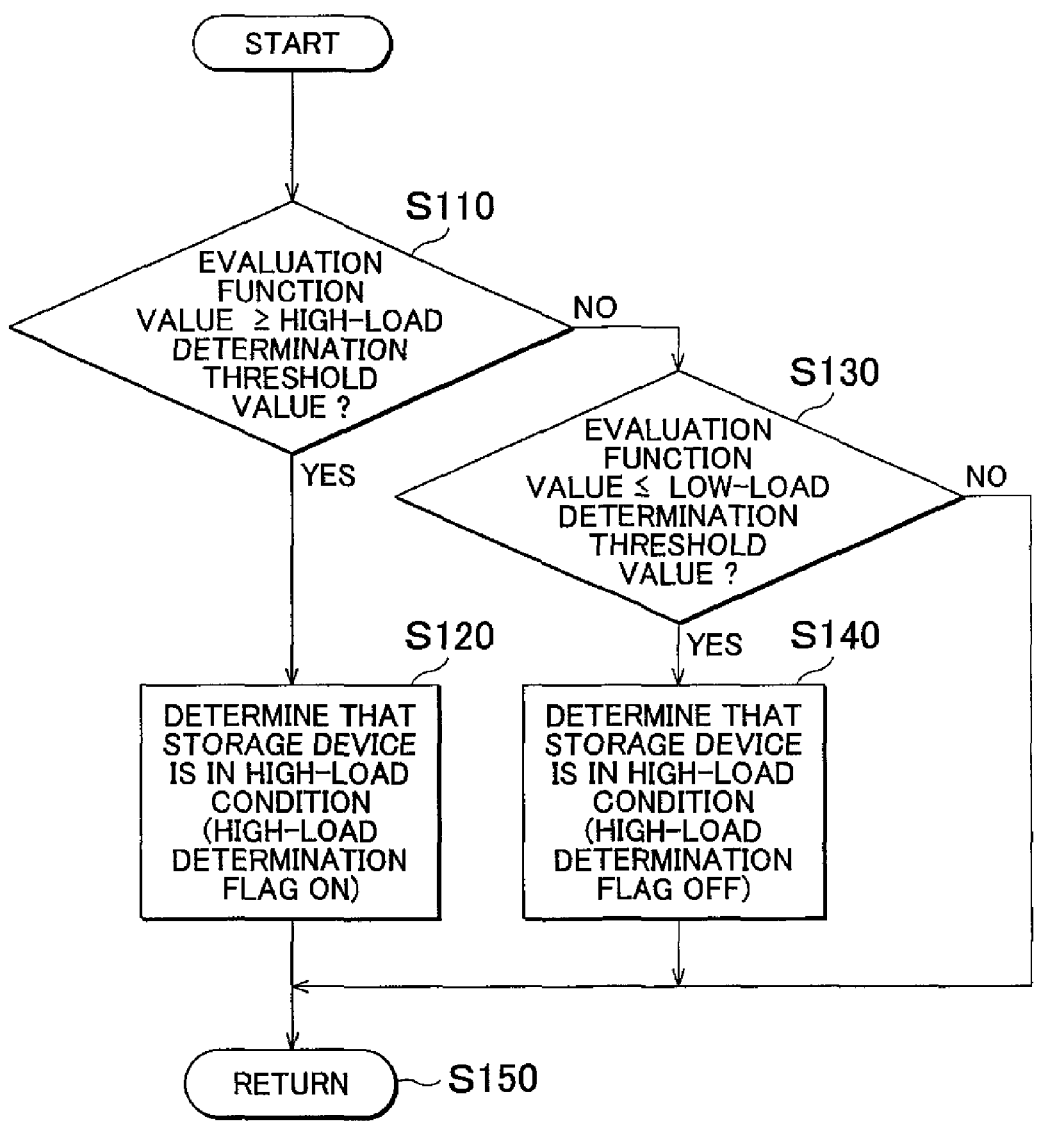
FIG. 7 is a flowchart used for explaining details of a process performed in step S10 shown in FIG. 6.

FIG. 7 is a flowchart for explaining the operation performed in step S10 shown in FIG. 6 in detail. Referring to FIG. 7, it is determined whether the value of the evaluation function for determining the load condition of the storage device B is equal to or larger than the threshold value H indicating that the storage device B is in a high-load condition (step S110). If it is determined that the evaluation function value is equal to or larger than the threshold value H (YES in step S110), the controller 60 determines that the storage device B is in a high-load condition, and sets the high-load determination flag FLG to ON (step S120).

On the other hand, if it is determined in step S110 that the evaluation function value is smaller than the threshold value H (NO in step S110), the controller 60 determines whether the evaluation function value is equal to or smaller than the threshold value L indicating that the storage device B is in a low-load condition (step S130). If it is determined that the evaluation function value is equal to or smaller than the threshold value L (YES in step S130), the controller 60 determines that the storage device B is in a low-load condition, and sets the high-load determination flag FLG to OFF (step S140). If it is determined in step S130 that the evaluation function value is larger than the threshold value L (NO in step S130), the controller 60 proceeds to step S150.

Referring again to FIG. 6, the controller 60 determines whether the load condition of the storage device B is a high-load condition, based on the result of determination in step S10 (step S20). If it is determined that the load condition of the storage device B is not the high-load condition (the high-load determination flag FLG is OFF) (NO in step S20), the controller 60 sets the rate of increase of the permissible output power Wout to the rate of increase A (step S30).

On the other hand, if it is determined in step S20 that the load condition of the storage device B is the high-load condition (the high-load determination flag FLG is ON) (YES in step S20), the controller 60 sets the rate of increase of the permissible output power Wout to the rate of increase C (<A) (step S40). The controller 60 then proceeds to step S50.

Subsequently, the controller 60 executes processing on the rate of increase of the permissible output power Wout when it returns from a restricted condition (step S50). More specifically, the rate of increase of the permissible output power Wout when the permissible output power Wout returns from its restricted condition is restricted to a value set in step S30 or step S40. The movement of the permissible output power Wout on which the processing of step S50 has been performed is indicated by the solid line in FIG. 2.

As described above, in this embodiment, the permissible output power Wout of the storage device B is restricted based on the load condition of the storage device B. When the permissible output power Wout returns from a condition where it is restricted, the rate of increase of the permissible output power Wout is reduced as the permissible output power Wout is more likely to be restricted; therefore, rapid variations in the output of the storage device B due to restriction and returning of the permissible output power Wout are suppressed. Thus, according to this embodiment, deterioration of the driveability due to rapid variations in the driving force for running the vehicle can be reduced.

In this embodiment, the situation where the permissible output power Wout is likely to be restricted is determined based on the load condition of the storage device B. The load condition of the storage device B is determined based on the evaluation function indicating the condition of the storage device B. Thus, according to this embodiment, the situation where the permissible output power Wout is likely to be restricted can be accurately determined, and the rate of increase of the permissible output power Wout when it returns from the restricted condition is prevented from being unnecessarily reduced.

In the illustrated embodiment, when the value of the evaluation function exceeds the threshold value H, and it is thus determined that the storage device B is in a high-load condition, the rate of increase of the permissible output power Wout is reduced. However, the rate of increase of the permissible output power Wout may be changed according to the value of the evaluation function. More specifically, the rate of increase of the permissible output power Wout may be reduced to a smaller value as the value of the evaluation function is larger.

FIG. 8 shows one example of the rate of increase of the permissible output power Wout, which is set according to the value of the evaluation function. Referring to FIG. 8, E1-E5 represent values of the evaluation function, which have a relationship that E1<E2<E3<E4<E5. When the evaluation function value is equal to or smaller than E2, the rate of increase of the permissible output power Wout is set to the rate of increase A used when the storage device B is in a low-load condition. When the evaluation function value is equal to E3, the rate of increase of the permissible output power Wout is set to one half of the rate of increase A. When the evaluation function value is equal to E4, the rate of increase of the permissible output power Wout is set to 0.2 times the rate of increase A. When the evaluation function value is equal to E5, the rate of increase of the permissible output power Wout is set to 0.1 times (or one-tenth of) the rate of increase A.

Thus, the rate of increase of the permissible output power Wout can be circumstantially set according to the load condition of the storage device B.

Also, two or more evaluation functions may be used for evaluating the load condition of the storage device B. For example, the above-mentioned evaluation function based on the current IB flowing into or out of the storage device B, and another evaluation function based on the temperature of the storage device B may be provided. Then, the load condition of the storage device B may be evaluated based on values of the two or more evaluation functions.

FIG. 9 indicates the relationship between values of two evaluation functions and the load condition of the storage device. Referring to FIG. 9, "evaluation function 1" is a function based on the current IB flowing into and out of the storage device B, for example, and "evaluation function 2" is a function based on the temperature of the storage device B, for example. If the value of the evaluation function 1 exceeds a threshold value H1, or the value of the evaluation function 2 exceeds a threshold value H2, it is determined that the storage device B is in a high-load condition.

If the value of the evaluation function 1 is smaller than a threshold value L1, and the value of the evaluation function 2 is smaller than a threshold value L2, it is determined that the storage function B is in a low-load condition. If the value of the evaluation function 1 exceeds a threshold value W1, or the value of the evaluation function 2 exceeds a threshold value W2, the above-mentioned protection control for restricting the permissible output power Wout so as to protect the storage device B is executed.

Although not particularly illustrated, it may be determined that the storage device B is in a high-load condition when the values of the evaluation functions 1, 2 respectively exceed the threshold values H1, H2. The load condition of the storage device B may also be evaluated based on values of three or more evaluation functions.

In the illustrated embodiment, the load condition of the storage device B is evaluated based on the evaluation function, and it is determined whether the permissible output power Wout is likely to be restricted, based on the result of the evaluation. However, it may be determined whether the permissible output power Wout is likely to be restricted, using an index in place of the evaluation function. For example, it may be determined whether the permissible output power Wout is likely to be restricted, based on the amount of restriction of the permissible output power Wout under the protection control. Namely, it may be determined that the permissible output power Wout is likely to be restricted when the amount of restriction of the permissible output power Wout is large.

It may be determined whether the permissible output power Wout is likely to be restricted, based on the history of the operation amount of the accelerator pedal. For example, it may be determined that the permissible output power Wout is likely to be restricted when the accelerator pedal is largely depressed at a high frequency.

In the illustrated embodiment, rapid variations in the permissible output power Wout are suppressed or lessened by reducing the rate of increase of the permissible output power Wout, in the situation where the permissible output power Wout is likely to be restricted (the storage device B is in a high-load condition) when the permissible output power Wout returns from the restricted condition. However, variations in the permissible output power Wout may be suppressed or lessened by other means. For example, in the situation where the permissible output power Wout is likely to be restricted, the rate of increase of the torque of the motor-generator 50 may be restricted, so as to restrict the rate of increase of the output power of the storage device B, and thus suppress rapid variations in the permissible output power Wout. Alternatively, in the situation where the permissible output power Wout is likely to be restricted, the rate of increase of the driving force for running the vehicle may be restricted, so as to restrict the rate of increase of the output power of the storage device B, and thus suppress rapid variations in the permissible output power Wout.

While the step-up converter 30 is provided between the storage device B and the inverter 40 in the illustrated embodiment, this invention is applicable to a vehicle that does not include the step-up converter 30.

In the above description, the invention has been explained using the electric vehicle on which the motor-generator 50 is installed. However, the range of application of this invention is not limited to the electric vehicle, but includes a hybrid vehicle on which an engine is further installed, a fuel-cell vehicle on which a fuel cell is further installed, and so forth.

In the above description, the motor-generator 50 corresponds to one example of "electric motor" according to the invention, and the Wout restriction control unit 104 of the controller 60 corresponds to one example of "restriction control unit" according to the invention. The load condition determining unit 102 corresponds to one example of "determining unit" according to the invention.

The embodiments of the invention disclosed herein are to be considered in all respects as illustrative and not restrictive. The scope of the invention is defined by the appended claims, but not determined by the description of the above embodiments, and all changes made within the meaning and range of equivalency of the claims are intended to be embraced in the scope of the invention.

What is claimed is:

1. An electric vehicle comprising:
   an electric storage device;
   an electric motor that generates driving force for running the vehicle, using electric power output from the electric storage device; and
   a controller that controls an output of the electric storage device, the controller including:
      a restriction control unit that restricts a permissible output power indicating electric power that is permitted to be output from the electric storage device, based on a load condition of the electric storage device, and
      an output control unit that reduces a rate of increase of the electric power output from the electric storage device after cancellation of a restricted condition in which the permissible output power is restricted by the restriction control unit, when the output control unit determines that the permissible output power is likely to be restricted again by the restriction control unit.

2. The electric vehicle according to claim 1, wherein:
the output control unit determines whether the permissible output power is likely to be restricted by the restriction control unit, based on the load condition of the electric storage device.

3. The electric vehicle according to claim 2, wherein:
the controller further includes a determining unit that determines the load condition of the electric storage device based on a given evaluation function indicating a condition of the electric storage device; and
the output control unit sets the rate of increase of the electric power after cancellation of the restricted condition, to a predetermined first value, when the determining unit determines that the electric storage device is in a low load condition, and sets the rate of increase of the electric power after cancellation of the restricted condition, to a second value that is smaller than the first value, when the determining unit determines that the electric storage device is in a high load condition.

4. The electric vehicle according to claim 3, wherein:
the evaluation function is based on input or output current of the electric storage device.

5. The electric vehicle according to claim 2, wherein:
the output control unit estimates the load condition of the electric storage device, based on a history of an operation amount of an accelerator pedal.

6. The electric vehicle according to claim 2, wherein:
the output control unit estimates the load condition of the electric storage device, based on an amount of restriction of the permissible output power.

7. The electric vehicle according to claim 1, wherein:
the output control unit reduces a rate of increase of the permissible output power as the permissible output power is more likely to be restricted by the restriction control unit when returning from the restricted condition.

8. The electric vehicle according to claim 1, wherein:
the output control unit restricts a rate of increase of torque of the electric motor as the permissible output power is more likely to be restricted by the restriction control unit when returning from the restricted condition.

9. The electric vehicle according to claim 1, wherein:
the output control unit restricts a rate of increase of the driving force for running the vehicle as the permissible output power is more likely to be restricted by the restriction control unit when returning from the restricted condition.

10. A method of controlling an electric vehicle including an electric storage device, and an electric motor that generates driving force for running the vehicle, using electric power output from the electric storage device, comprising:
restricting a permissible output power indicating electric power that is permitted to be output from the electric storage device, based on a load condition of the electric storage device; and
reducing a rate of increase of the electric power output from the electric storage device after cancellation of a restricted condition in which the permissible output power is restricted, when the permissible output power is likely to be restricted again by the restriction control unit.

11. The method of controlling the electric vehicle according to claim 10, wherein:
it is determined in reducing the rate of increase whether the permissible output power is likely to be restricted, based on the load condition of the electric storage device.

12. The method of controlling the electric vehicle according to claim 11, further comprising determining the load condition of the electric storage device based on a given evaluation function indicating a condition of the electric storage device, wherein:
the rate of increase of the electric power after cancellation of the restricted condition is set to a predetermined first value in reducing the rate of increase, when it is determined in determining the load condition that the electric storage device is in a low load condition, and the rate of increase of the electric power after cancellation of the restricted condition is set to a second value that is smaller than the first value, when it is determined in determining the load condition that the electric storage device is in a high load condition.

13. The method of controlling the electric vehicle according to claim 10, wherein:
a rate of increase of the permissible output power is reduced in reducing the rate of increase as the permissible output power is more likely to be restricted when returning from the restricted condition.

* * * * *